United States Patent [19]

Whang

[11] 3,867,481
[45] Feb. 18, 1975

[54] LOW MOLECULAR WEIGHT ACRYLIC MODIFIERS FOR RIGID VINYL HALIDE POLYMERS

[75] Inventor: Jong Jai Whang, Southampton, Pa.

[73] Assignee: Rohm and Haas Company, Philadelphia, Pa.

[22] Filed: June 2, 1970

[21] Appl. No.: 42,882

[52] U.S. Cl............ 260/899, 204/159.22, 260/890, 260/899, 260/901, 260/45.75 K
[51] Int. Cl..................... C08f 29/22, C08f 37/18
[58] Field of Search.................................... 260/899

[56] References Cited
UNITED STATES PATENTS

| | | | |
|---|---|---|---|
| 2,311,249 | 2/1943 | Powell | 260/32 |
| 2,791,600 | 5/1957 | Schwaegerle | 260/899 |
| 3,084,065 | 4/1963 | Bach | 117/75 |
| 3,316,192 | 4/1967 | Seibel | 260/23 |
| 3,373,229 | 3/1968 | Philpot et al. | 260/899 |
| 3,485,775 | 12/1969 | Cenci et al. | 260/899 |
| 3,536,788 | 10/1970 | Hurwitz et al. | 260/890 |

FOREIGN PATENTS OR APPLICATIONS

| | | | |
|---|---|---|---|
| 550,610 | 12/1957 | Canada | 260/899 |
| 523,788 | 4/1956 | Canada | 260/899 |
| 120,936 | 2/1946 | Australia | 260/899 |
| 1,033,464 | 6/1966 | Great Britain | 260/899 |

Primary Examiner—Murray Tillman
Assistant Examiner—Richard B. Turer
Attorney, Agent, or Firm—Michael B. Fein

[57] ABSTRACT

Improved molding compositions based on polyvinyl halides modified with acrylic polymers are provided. The polymeric modifiers have molecular weights of from 1,500 to less than 10,000 and contain residues of (A) from 75 to 100 percent by weight alkyl methacrylate and (B) from 0 to 25 percent of at least one additional ester of acrylic or methacrylic acid, styrene or substituted styrene. The molding compositions provide improved flow characteristics and processing characteristics.

16 Claims, No Drawings

LOW MOLECULAR WEIGHT ACRYLIC MODIFIERS FOR RIGID VINYL HALIDE POLYMERS

The present invention relates to acrylic polymers useful as modifiers for rigid polyvinyl halides. More specifically, the present invention is directed to the use of a low molecular weight acrylic polymer containing (1) an alkyl methacrylate and (2) one or more additional acrylic or methacrylic acid ester, and/or a styrene, to improve processing characteristics of rigid polyvinyl halide resins.

Polyvinyl halides are widely utilized in the production of plastic articles but for most uses they must be modified, compounded or copolymerized with other materials in order to provide a processable and useful composition. For the purpose and scope of the present specification, the terms "polyvinyl halide" and "polyvinyl halide composition" include all compositions which have vinyl halides as the major (greater than 50 percent) component or starting material. The term vinyl, as used herein includes vinylidene as well as vinyl halides. The polyvinyl halide resins include, but are not limited to, polyvinyl chloride (hereinafter PVC), copolymers of vinyl chloride with other monomers that include vinyl alkanoates such as vinyl acetate and the like, vinylidene halides such as vinylidene chloride, alkyl esters of unsaturated carboxylic acids such as acrylic acid, for example ethyl acrylate, 2-ethylhexyl acrylate, and the like, unsaturated hydrocarbons of from about 2 to 6 carbon atoms such as ethylene, propylene, isobutylene and the like, allyl compounds such as allyl esters of short chain carboxylic acids, e.g. allyl acetate and the like etc. Modified versions of the above polymers include those where modifiers are added for impact strength, such as acrylic elastomeric impact modifiers, (e.g. butyl acrylate copolymers and the like), for flexibility with materials such as plasticizers (e.g. dioctyl phthalate, polypropylene adipate and the like), as well as other modifiers such as chlorinated polyethylene. The molecular weight and molecular weight distribution of the vinyl halide polymers in the present compositions is not critical to the aims, purposes and results of the present invention. In general, the polyvinyl halide have Fikentscher K-values in the range of 40 to 95. The Fikentscher K-value is determined by the formula $$\frac{\text{Log } [\eta]_{rel}}{C} = \frac{75 \times 10^{-6} K^2}{1 + 1.5 \times 10^{-3} KC} + 10^{-3} K$$

Wherein:
C is a constant concentration of vinyl halide resin in solvent equalling 0.5 grams/100/ml
$[\eta]_{rel}$ is a relative viscosity in cyclohexanone at 25°C.
K is the Fikentscher value The above modifications of polyvinyl halide compositions are often necessary due to inherent limitations of the material. For many end uses, it is desirable that the resultant product possess toughness, durability, and be easily processed. Unmodified rigid polyvinyl halide compositions, such as polyvinyl chloride (PVC), are extremely difficult to process. As a result, the polymer requires modification which may be accomplished through the use of processing aids. These processing modifiers include high molecular weight acrylic polymers. These prior art acrylic processing aids have glass temperatures approximately equal to the polyvinyl halide compositions to be processed. U.S. Pat. No. 3,373,229 to Philpot describes advantages for increasing the molecular weight of the acrylic processing aid. These high molecular weight polymers do not disperse well in many vinyl halide resins, particularly those based on relatively low molecular weight vinyl halide polymers. These polymers improve the processing characteristics of compositions on mill rolls at high temperatures. They improve processing characteristics on mill rolls such as release and speed of flux, however, other processing characteristics important in such operations as injection molding and extrusion are not substantially improved. Other prior art modifiers include high molecular weight copolymers containing relatively larger quantities of the "softer" alkyl acrylate units. The inclusion of these "softer" units improves the dispersibility in lower molecular weight polyvinyl halides but have the other deficiencies. Elastomeric polymeric impact modifiers improve certain processing characteristics of vinyl halide compositions to some degree, but still do not significantly affect the processing characteristics in extrusion and injection molding type processes.

Even with the prior art modifiers, the usual fabrication temperatures for rigid PVC compositions can lead to thermal degradation of the compounds during extended fabrication periods. At the temperature of extrusion, injection molding, thermoforming, blow molding and the like, PVC compositions tend to degrade due to the relatively poor heat stability of PVC. It is desirable that these PVC compositions be processed in these operations at lower temperatures and with shorter cycle times, thereby minimizing the chance for thermal degradation. Certain compounds such as common plasticizers like dioctyl phthalate that flexibilize and soften the composition at service temperatures, also improve the flow characteristics of PVC. Of course, when the end use of the part requires rigidity and resistance to deformation at elevated temperatures, the use of plasticizers cannot be tolerated. It is also known that polyesters such as polypropylene terephthalate act as flow-improving processing aids, however, there are deficiencies with these systems.

It has now been discovered that low molecular weight acrylic polymers act as flow-improving processing modifiers. The inclusion of these flow improvers either improves or at least does not significantly detract from the physical characteristics of vinyl halide compositions. The polymeric compositions of this invention comprise about 70 to 99 weight percent of a vinyl halide polymer, such as PVC, and from 1 to about 30 weight percent of an acrylic addition polymer of at least 75 weight percent of at least one monomer chosen from the group consisting of lower alkyl methacrylates, such as methyl methacrylate, and the balance of the acrylic polymer comprising at least one additional material selected from the group consisting of esters of acrylic and methacrylic acid, such as ethyl acrylate and substituted and unsubstituted styrene, wherein the molecular weight of the acrylic polymer is in the range of about 1500 to less than 10,000.

Polymers with molecular weights significantly lower than this range act as plasticizers for the rigid compositions if they are miscible therein. If these lower molecular weight polymers are not miscible in the vinyl halide compositions, an undesirably brittle product is obtained.

The inclusion of the flow improvers of this invention allows the PVC compositions to be processed under many conditions heretofore avoided with many vinyl halide based materials. The inclusion of these flow improvers does not adversely affect the individual physical properties of the PVC compositions to any significant degree. In fact, many of the physical properties and the other processing characteristics are improved, such as clarity, durability, surface quality and others. Other deficiencies of PVC compositions and the beneficial effects obtained by including these flow improvers will be clear upon reading the entire specification.

Thus the prior art ABS, MBS, CPE and acrylic vinyl halide resin modifiers do not meet all of the above requirements in that at least one deficiency is noted for each modifier. The present invention, on the other hand, provides a means for upgrading the processing characteristics of acrylic modified vinyl halide resins, without losses in the physical characteristics of the blends thereof. Moreover, the final physical characteristics of the molding compositions comprising the blend of the acrylic modifiers of the present invention and the polyvinyl halide is improved.

The acrylic modifiers of the present invention improve the processing characteristics of the modified polyvinyl halide compositions as well as slightly improving, or at least, not deleteriously affecting such characteristics of the resin as the impact strength. Additionally, the acrylic modifiers of the present invention may be blended with vinyl halide resins more easily than the higher molecular weight modifiers of the prior art and provide better dispersability than standard high methacrylate content acrylic modifiers. During the processing of compositions containing the present acrylic modifiers, extrusion is improved and in particular, melt fracture is reduced and die swell minimized. Finally, the molded product of the present invention exhibits high clarity and light transmittance as well as low odor when compared to prior molding compositions. The term "molding compositions" used throughout the present specification does not limit the processes contemplated for the use of such compositions but refers to the broad class of molding processes, for example injection, extrusion, calendering, film blowing, and other molding processes.

The acrylic modifiers of the present invention are polymers of at least 75 percent by weight acrylic units which are lower alkyl of methylacrylic acid. The alkyl group includes straight and branched chains of from 1 to about 4, such as methyl, ethyl, isobutyl, and the like. The other monomers are utilized to prepare the acrylic polymers of the present invention are esters of acrylic and methacrylic acid which are different from the low alkyl esters above, and substituted and unsubstituted styrenes.

The esters of acrylic and methacrylic acid include alkyl and aryl esters of the acids wherein the alkyl group may be straight chain, and branched chain. The term aryl includes aralkyl and alkaryl groups which may be substituted, if desired, on both the aliphatic portions and on the aromatic portions. The alkyl acrylates and methacrylates usually include those wherein the alkyl group contains 1 to 15 carbon atoms. In the preferred alkyl acrylates and methacrylates the alkyl groups contain 1 to 4 carbon atoms. Examples of alkyl, and aryl, methacrylates and acrylates include methyl methacrylate, ethyl methacrylate, n-propyl methacrylate, isopropyl methacrylate, n-butyl methacrylate, isobutyl methacrylate, stearyl methacryalte, phenyl methacrylate, benzyl methacrylate, corresponding acrylates and the like. Suitable substitutions on these methacrylates include halogen (e.g. chlorine), hydroxy, alkoxy (e.g. methoxy), alkylthio (e.g. ethylthio), cyano, and the like.

When substituted styrene is utilized as a component, the substituents usually are from about 1 to 5, preferably about 1 to 3 carbon atoms in chain length, but may be other nondeleterious substituents. Exemplary of the substituted styrenes useful in the acrylate polymers of the present invention include $\alpha$-methyl styrene, chlorostyrene, $\alpha$-hydroxy methyl styrene, and the like. Exemplary substituents for such compounds are halogens, hydroxy groups, alkoxy groups, as well as lower alkyl groups, etc.

As noted above, there may be included one or more acrylate or methacrylate in the polymeric modifier. Thus, when styrene, a substituted styrene, an acrylate, or a methacrylate is polymerized with the lower alkyl methacrylate, the mixture may contain as an additional polymerizable component, i.e. another acrylate or methacrylate. These acrylates and methacrylates, generally, are the same as those above. However, the preferred acrylates and methacrylates are generally softer and have homopolymers which have glass temperatures lower than the lower alkyl methacrylates. Generally, when utilized these preferred alkyl acrylates and methacrylates contain from 1 to 8 carbon atoms in the alkyl group which may be branched or unbranched and preferably they contain from 1 to 4 carbon atoms. The alkyl acrylates and methacrylates include methyl acrylate, ethyl acrylate, n-propyl acrylate, isopropyl acrylate, n-butyl acrylate, isobutyl acrylate, 2-ethyl hexyl acrylate, stearyl acrylate, and the like.

The modified compositions of the present invention may contain from 70 to 99 percent by weight of a vinyl halide polymer modified with from about 1 to 30 percent by weight of the acrylic modifier. Usually, however, the amount of acrylic modifier varies from 2 to about 20 percent by weight, preferably about 2 to 10 percent by weight. The acrylic modifier contains the residues of from 75 to 100 percent by weight of a lower alkyl methacrylate, from 0 to 25 percent by weight residues of one or more materials selected from the group consisting of additional esters of acrylic and methacrylic acid, and substituted and unsubstituted styrene. In its preferred composition, the acrylic modifiers of the present invention contain from 80 to 90 percent by weight of lower alkyl methacrylate and from 10 to 20 percent by weight of one or more esters of acrylic or methacrylic acid and/or substituted or unsubstituted styrene. The above percentages are based on the total vinyl halide polymer-acrylic modifier content of the material. The number average molecular weight of the acrylic polymers of the present invention is at least about 1,500, generally from about 1500 to less than 10,000 and preferably from 2,000 to about 9,000. This minimum molecular weight is critical to the present invention, in view of the fact that when the polymer is of a molecular weight lower than this amount, the resultant modified vinyl halide polymer is plasticized, and when high styrene content or high molecular weight materials are utilized, the mixture has a tendency to be brittle upon forming of the final product therefrom. Further, when the material has a molecular weight above the ranges noted herein, the prior art problems regarding flow characteristics and processability of acrylic modified vinyl halide resins occur. The flow improving polymers of this invention are generally compatable with the rigid polyvinyl halides, act as processing aids at elevated temperatures, and do not significantly affect the properties of polyvinyl halide at lower temperatures. They do not deleteriously affect service temperatures of the molded parts.

Blending of the polymeric modifier of the present invention and the vinyl halide polymer, can be accomplished by any convenient technique, entirely satisfactory blends can be accomplished in a roll mill at convenient and customary operating conditions, such as about 350° F., for about 5 to 15 minutes. Dry mixing techniques such as a mechanical mixer-blender, can also be employed. The polymer blends can, if desired, be processed in commerical extrusion equipment. Conditions vary with the molecular weight of the polyvinyl halide utilized and with the equipment employed for that purpose. Certain other types of processing aids, stabilizers, and the like are often incorporated into the blend. The stabilizers, which serve to prevent the breakdown of the polyvinyl halides, are of several different types, including those which stabilize against thermal and ultraviolet light degradation, discoloration, and the like.

Other materials which may be included in the blends, prepared in accordance with the present invention, include lubricants such as stearic acid, stearyl alcohol, eicosanol, and other known materials such as; colorants, including organic dyes such as Anthraquinone Red R, and the like; organic pigments and lakes such as Phthalocyanine Blue and the like; inorganic pigments such as titanium dioxide, cadmium sulfide and the like; fillers and particulate extenders such as carbon black, amorphous silica, asbestos, magnesium carbonate, and the like; and plasticizers such as dioctyl phthalate, dibenzyl phthalate, butyl benzyl phthalate, hydrocarbon oils, and the like.

While only a few such materials have been specifically recited, it is not intended to exclude others. The recitation is exemplary only, and each category of components is common and well-known in the art. The art known components include extremely large numbers of materials which are equally well suited for inclusion in the materials of the present invention. Such inclusions can be made at any stage of preparation in accordance with accepted techniques well known to those ordinarily skilled in the art. These inclusions are in proportions which are commonly employed. Such additional materials are not of significant interest in the present invention and form no part thereof.

The blended compositions prepared in accordance with the present invention are tough, rigid, thermoplastic, chemical resistant materials having high heat distortion temperatures, excellent stability characteristics, and are easily processed in conventional extrusion apparatus with little or no die swelling. Of particular interest are blended compositions containing in addition to the flow improvers of this invention, at least one elastomeric polymer designed to improve the impact strength of the molded part. The blended compositions are particularly useful in forming plastic pipes and extruded shapes of a similar nature.

The acrylic modifiers of the present compositions are prepared, for example, by solution, emulsion, or bulk polymerization in manners well known in the art. When emulsion polymerization is utilized the polymer is produced by polymerizing the monomers noted above in the amounts noted above, in the presence of an emulsifying agent such as a soap or a soapy material, and with a catalyst which is usually a free radical catalyst such as a redox pair, or a peroxy compound. In addition, irradiation, or thermal initiation may be utilized in order to assist affecting the polymerization of the acrylic monomers which form the acrylic modifiers of the present invention.

In bulk polymerization, conventional processing is utilized so that the resultant polymer is within the scope of the present invention. Such bulk polymerization can be affected with free radical generating catalysts, and is normally affected in the presence of one or more solvents if desired.

To assist those skilled in the art in the practice of the present invention, the following modes of operation are set forth as illustrations. Parts and percentages are by weight unless otherwise specifically noted.

EXAMPLE I

Various homo and co-polymers of methyl methacrylate are prepared by bulk polymerization in the presence of initiators containing acetyl peroxide, lauroyl peroxide and tert-butyl hydroperoxide. The polymerizations are carried out at about 68°C. for about 16 to 18 hours, followed by a period of about 6 hours at 120°C. The resultant polymer is then granulated to a powder form and may be used as the processing aid of the present invention. Table I shows several polymers prepared in accordance with this procedure.

TABLE I

| Trial | Composition MMA/EA | % n-DDM | % Total Initiator | $\overline{M}_n$ [2] |
|---|---|---|---|---|
| 1 | 100/0 | 2 | .105 | 7100 |
| 2 | 100/0 | 4 | .105 | 4100 |
| 3 | 100/0 | 7.5 | .21 | 2700 |
| 4 | 90/10 | 2 | .105 | 7100 |
| 5 | 90/10 | 4 | .21 | 4100 |
| 6 | 90/10 | 7.5 | .21 | 2600 |

[1]The following abbreviations are used throughout the examples:
MMA is methyl methacrylate
EA is ethyl acrylate
n-DDM is n-dodecyl mercaptan
IBoMA is Isobornyl methacrylate
[2]This is the number average molecular weight

EXAMPLE 2

Several polymers of the present invention are mixed with a commercially available, high molecular weight homopolymer of vinyl chloride (PVC) powder, along with 1 percent by weight tin mercaptide as a stabilizer, and melt flow data are obtained at 400° F. and 1000 sec$^{-1}$. As shown in Table II the service temperature of the PVC is not affected while other tests show that the composition is an effective processing aid.

TABLE II

| Trial | Blend Composition (% Acrylic in PVC) | $\overline{M}_n$ | Monomers | Composition | Melt Flow Visc.(poise) | Vicat softening point (°C) |
|---|---|---|---|---|---|---|
| 8 | (control) | — | — | — | 7000 | 84 |
| 9 | 10% | 7100 | MMA-/EA | 90/10 | 6000 | 86 |
| 10 | 20% | 7100 | MMA-/EA | 90/10 | 3800 | 88 |

EXAMPLE 3

Table III shows various characteristics of the present acrylic polymers mixed with the polyvinyl chloride of Example II to produce the compositions of the present invention. As can be seen from the table, melt viscosity at 400° F. is significantly reduced without appreciable loss in the heat distortion temperature under load, or thermal stability.

TABLE III

| Trial | Percent Modifier[4] | Viscosity 400°F. (poise)[5] | DTUL °C.[6] | Heat Stability (hrs.)[7] | Crease Whitening[8] |
|---|---|---|---|---|---|
| 14 | 0 | 6800 | 75 | 3 | 0 |
| 15 | 5 | 6500 | 73 | — | — |
| 16 | 10 | 6150 | 73 | — | — |
| 17 | 15 | 5600 | 72 | 2–3 | 0 |
| 18 | 20 | 5100 | 71 | 3 | 0 |

[4]The modifier is a 90/10 copolymer of MMA and EA having a molecular weight of about 3000. The PVC modified has a K-value of 69.
[5]Melt Viscosity is measured using a Sieglaff-McKeluey rheometer at 400° F. and at a $10^3 \sec^{-1}$ shear rate.
[6]This is the heat distortion temperature under a load of 264 psi.
[7]This is the hours required at 350° F. before color appears.
[8]This is an optical test of the color change along a crease. The range is 0 to 10 with 0 being the best. The test is run on a ⅛" slab using a 90° bend.

EXAMPLE 4

Tests are run in accordance with the above examples and copolymers of vinyl chloride and vinyl acetate substituted for the PVC, the resultant compositions are slightly softer. These copolymers have 2.5 and 5 percent vinyl acetate residues, the remaining being vinyl chloride residues. The products, however, do not sacrifice any of the improved melt viscosity, and heat resistivity characteristics of the PVC homopolymer compositions. That is, the heat resistivity and melt viscosity improvements are essentially the same as those of the PVC compositions above.

The above compositions are also observed when tests are run utilizing copolymers of 97.5 percent vinyl chloride and 2.5 percent vinylidene chloride.

EXAMPLE 5

A molding composition is prepared from the following mixture comprising:
80 parts PVC (K=69)
10 parts Processing Modifier of Example III
10 parts of a typical elastomeric impact modifier prepared from essentially
  60 parts butadiene/styrene copolymer
  40 parts of a mixture of styrene and lower alkyl methacrylate The Izod impact strength of a molded part from this mix is in the range of 10 to 15 foot-pounds per inch of another. The part has good clarity and heat distortion characteristics essentially the same as unmodified PVC. The flow improvers of this invention are particularly effective in impact-modified compositions as the impact strength is not deleteriously affected.

What is claimed is:

1. A polymeric composition comprising from 70 to 99 weight percent of a vinyl halide polymer, wherein the vinyl halide polymer contains a major amount of vinyl halide, and from 1 to 30 weight percent of an acrylic addition polymer of
   A. at least 75 weight percent of at least one monomer chosen from the group consisting of lower alkyl methacrylates and
   B. the balance comprising at least one additional material selected from the group consisting of esters of acrylic and methacrylic acid, the number average molecular weight of said acrylic polymer being in the range of 2000 to 9000.

2. The composition of claim 1 wherein said acrylic polymer is a homopolymer of methyl methacrylate.

3. The composition of claim 1 wherein said acrylic polymer is present in an amount of from 2 to 20 weight percent.

4. The composition of claim 3 wherein said acrylic polymer is present in an amount of from 2 to 10 weight percent.

5. The composition of claim 1 wherein said component A has from 1 to 4 carbon atoms in the alkyl group.

6. The composition of claim 1 where said component B is selected from the group consisting of alkyl acrylates and methacrylates of from 1 to 15 carbon atoms in the ester group.

7. The composition of claim 1 wherein the alkyl ester group has from 1 to 4 carbon atoms.

8. The composition of claim 1 wherein said component A amounts to from 80 to 90 weight percent, and component B amounts to from 10 to 20 weight percent, based on said acrylic polymer.

9. The composition of claim 1 wherein said vinyl halide polymer is at least 50 weight percent vinyl chloride residues.

10. The composition of claim 9 where said vinyl halide polymer is a copolymer of vinyl chloride and a material selected from the group consisting of lower alkyl esters of acrylic acid, unsaturated hydrocarbons of from 2 to 6 carbon atoms, and vinyl esters of short chain carboxylic acids.

11. The compositions of claim 10 wherein said vinyl halide polymer is a copolymer of vinyl chloride and vinyl acetate.

12. The compositions of claim 1 wherein said vinyl halide polymer is a homopolymer of vinyl chloride.

13. A polymeric composition comprising from 90 to 98 weight percent of a vinyl chloride polymer, wherein the vinyl halide polymer contains a major amount of vinyl halide, and from 2 to 10 weight percent of an acrylic addition polymer of:
  A. 80 to 90 weight percent of an ester of methacrylic acid containing from 1 to 4 carbon atoms in the ester group, and
  B. from 10 to 20 weight percent of ethyl acrylate, the number average molecular weight of said acrylic polymer being from 2000 to 9000.

14. The composition of claim 13 wherein said vinyl chloride polymer contains residue of from 80 to 100 weight percent vinyl chloride and from 0 to 20 weight percent of a compound selected from the group consisting of allyl acetate, vinyl acetate, and ethyl acrylate.

15. The composition of claim 13 wherein said component A is methyl methacrylate.

16. The composition of claim 13 where said component B is ethyl acrylate.

* * * * *